(12) United States Patent
Ware

(10) Patent No.: US 6,615,542 B2
(45) Date of Patent: *Sep. 9, 2003

(54) PLANT GROWTH UNIT

(76) Inventor: Larry Austen Ware, 64 - 53rd Street, Delta, British Columbia (CA), V4M 2A9

(*) Notice: Subject to any disclaimer, the term of this patent is extended or adjusted under 35 U.S.C. 154(b) by 0 days.

This patent is subject to a terminal disclaimer.

(21) Appl. No.: 10/063,506

(22) Filed: May 1, 2002

(65) Prior Publication Data

US 2003/0089037 A1 May 15, 2003

Related U.S. Application Data

(63) Continuation-in-part of application No. 10/002,374, filed on Nov. 14, 2001.

(51) Int. Cl.$^7$ ................................................ A01G 9/02
(52) U.S. Cl. ............................................................ 47/83
(58) Field of Search ................................................ 47/83

(56) References Cited

U.S. PATENT DOCUMENTS

| | | | |
|---|---|---|---|
| 262,335 A | 8/1882 | Wagner | 47/83 |
| 2,152,869 A | 4/1939 | Campbell | 47/41.01 |
| 3,015,024 A | 12/1961 | Charchan et al. | 174/38 |
| 4,033,072 A | 7/1977 | Kobayashi et al. | 47/62 |
| 4,250,666 A | 2/1981 | Rakestraw | 47/83 |
| 4,812,952 A | 3/1989 | Clemens | 362/805 |
| 4,845,602 A | 7/1989 | Lehocki | 362/122 |
| 4,952,511 A | 8/1990 | Radmer | 362/340 |
| 4,986,027 A | 1/1991 | Harvey | 47/59 |
| 5,201,860 A | 4/1993 | Richardson | 47/39 |
| 5,217,696 A | 6/1993 | Wolverton et al. | 422/120 |
| 5,265,376 A | 11/1993 | Less | 47/83 |
| 5,276,997 A | 1/1994 | Swearengin et al. | 47/48.5 |
| 5,305,551 A | 4/1994 | Orlov | 47/79 |
| 5,363,594 A | 11/1994 | Davis | 47/82 |
| 5,381,625 A | 1/1995 | Wente | 47/82 |
| 5,440,836 A | 8/1995 | Lee | 47/60 |
| 5,502,923 A | 4/1996 | Bradshaw | 47/62 |
| 5,515,648 A | 5/1996 | Sparkes | 47/65 |
| 5,555,676 A | 9/1996 | Lund | 47/82 |

(List continued on next page.)

FOREIGN PATENT DOCUMENTS

| | | |
|---|---|---|
| EP | 0301362 | 7/1988 |
| EP | 0533939 | 5/1992 |
| EP | 1210868 | 1/2000 |
| FR | 1560632 | 2/1968 |
| GB | 2222063 | 4/1989 |
| JP | WO00/44220 | 3/2000 |

Primary Examiner—Charles T. Jordan
Assistant Examiner—Jordan M Lofdahl
(74) Attorney, Agent, or Firm—Graybeal Jackson Haley LLP

(57) ABSTRACT

The present invention relates to the field of plant growth units, and more particularly pertains to an apparatus for plant cultivation which conserves horizontal space and utilizes vertical space, while providing for the growth of plants which are cultivated in an indoor environment. The plant growth unit includes a plurality of growth sites, means for supporting the growth sites, and means for establishing a liquid nutrient flow. The growth sites may be radially supported about a central vertical longitudinal axis and the supporting means may define an internal space between the plurality of growth sites so that the growth sites generally face the internal space. The internal space may be adapted to accommodate a light source. The supporting means may have an upper portion and a lower portion, and may include one or more columns or one or more supporters. The means for establishing a liquid nutrient flow may circulate a liquid nutrient to the upper portion of the supporting means and past growth sites to the lower portion of the supporting means so that the liquid nutrient flow comes into contact with each of the growth sites.

39 Claims, 9 Drawing Sheets

U.S. PATENT DOCUMENTS

| | | | |
|---|---|---|---|
| 5,577,344 A | 11/1996 | Zaremba et al. | 108/150 |
| 5,683,762 A | 11/1997 | Banschick | 211/13.1 |
| 5,918,416 A | 7/1999 | Ammann, Jr. | 47/82 |
| 6,098,338 A | 8/2000 | Tilton | 428/15 |
| 6,178,692 B1 | 1/2001 | Graven | 47/82 |
| 6,230,437 B1 | 5/2001 | Wolverton et al. | 47/39 |
| 6,477,805 B2 * | 11/2002 | Ware | 47/83 |

* cited by examiner

PLANT GROWTH UNIT

BACKGROUND OF INVENTION

A typical hydroponic plant growth system comprises a nutrient base and circulates a liquid nutrient through a cultivation portion wherein the plant seeds or young plants are anchored. For example, U.S. Pat. No. 5,502,923 discloses a hydroponic plant growth system which consists of a nutrient supply module base which supplies liquid nutrient to a series of vertically stacked prop modules, each prop module containing a number of plant growth sites. As liquid nutrient is pumped to each prop module, water is distributed to the plants grown therein.

U.S. Pat. No. 4,986,027 discloses a plant growth apparatus comprising a flexible tubular element wherein slits are provided for the growth of plants. A fluid nutrient is supplied to the root permeable material via a pump system, the fluid nutrient thereby being supplied to the plants.

Similarly, U.S. Pat. Nos. 5,440,836, 5,555,676, 5,918,416 and 4,033,072 all disclose vertical growing columns for growing a number of plants which are supplied water and nutrients through the use of nutrient solution pumps in the base of the respective apparatuses, which supply liquid nutrient to the top of the apparatuses. The liquid nutrient is supplied to the plants as the liquid travels from the top of the apparatuses to the bases.

Further, the prior art indicates that multiple vertical plant grow columns may utilize a single nutrient base. For example, U.S. Pat. No. 5,363,594 discloses a structure for a vertically oriented plant growth unit having a plurality of vertical columns arranged to conserve horizontal floor space and utilize a common base for the supply of liquid nutrient.

One of the potential limitations of the growth units described above is that the various plants of the growth units may receive different types and amounts of light from whatever light source is utilized. The differences in light quality and quantity may result in a divergence in growth and quality between plants grown at various levels and on various sides of the vertical columns.

U.S. Pat. No. 6,178,692 discloses a lighting system for use with one or more vertical growing columns. The lighting system is mobile and can apparently be angled to provide for equidistant lighting to the plants at both the top and the bottom of the vertical growth column. However, it would appear that equidistant lighting is to be provided by the lighting apparatus to a single side of each growth column. Each vertical column apparently has plants growing on all sides of the vertical unit and therefore a single lighting unit would appear only to provide equidistant lighting to those plants which are somewhat facing the lighting unit. To provide equidistant lighting to all plants on the growing columns, it would appear that two lighting units are set up on either side of one or more growing columns and angled to provide top to bottom equidistant lighting on each side of the vertical grow columns, thereby providing equidistant lighting to all plants. In at least some embodiments, this system therefore appears to be limited by the requirement for multiple lighting units to create equidistant lighting to all plants.

SUMMARY OF INVENTION

In one aspect, the present invention provides for a plant growth unit including a plurality of growth sites, means for supporting the growth sites, and means for establishing a liquid nutrient flow. The growth sites may be radially supported about a central vertical longitudinal axis and the supporting means may define an internal space between the plurality of growth sites so that the growth sites generally face the internal space. The internal space may be adapted to accommodate a light source. The supporting means may have an upper portion and a lower portion. The means for establishing a liquid nutrient flow may circulate a liquid nutrient to the upper portion of the supporting means and past growth sites to the lower portion of the supporting means so that the liquid nutrient flow comes into contact with each of the growth sites.

In some embodiments, the plant growth unit may have two or more of the growth sites approximately equidistant from the longitudinal axis. In yet other embodiments, at least some of the growth sites are vertically spaced apart, and the growth sites at generally the same vertically level are approximately equidistant from the longitudinal axis.

In some embodiments, the supporting means may include one or more columns radially disposed about the longitudinal axis, the one or more columns having longitudinal passages through which the liquid nutrient may pass. In other embodiments, the supporting means may include one or more supporters radially disposable about the longitudinal axis, operable to form a generally closed perimeter around the internal space.

In some embodiments, the plant growth unit may further include means for containing the liquid nutrient. The containing means may be, for example, a nutrient supply module. Alternatively, the liquid nutrient may by contained within the supporting means itself.

In some embodiments where the supporting means are one or more columns, the liquid nutrient flow is established by circulating the liquid nutrient from a nutrient supply module, in fluid communication with the one or more columns, to the upper portion of the one or more columns, through a longitudinal passage in the one or more columns to the respective lower portion of the one or more columns. In embodiments where the supporting means are one or more supporters, the liquid nutrient flow is established by circulating the liquid nutrient to the upper portion of the one or more supporters past the growth sites to the respective lower portion of the one or more supporters.

In some embodiments, the plant growth unit further includes at least one pump facilitating the liquid nutrient flow. The growth sites may protrude upwardly from the supporting means and the plant growth unit may further include a plurality of baskets adapted to hold plants and attachable to the growth sites. The plants may be anchored to the growth unit by being placed inside the baskets, which are then attached to the growth sites.

In another aspect, the present invention provides a plant growth unit including a nutrient supply module, one or more columns and a plurality of growth sites supported by the one or more columns. The nutrient supply module may be designed to contain a liquid nutrient. The one or more columns may be radially disposed about a central vertical longitudinal axis to define an internal space between the one or more columns. The internal space may be adapted to accommodate a light source. Each column may have an upper portion, a lower portion and a longitudinal passage through which the liquid nutrient may pass. Further, each column may be in fluid communication with the nutrient supply module for circulation of a liquid nutrient flow from the nutrient supply module to the upper portion of each of the one or more the columns and through the longitudinal passage to the respective lower portion of each of the one or more columns. The plurality of growth sites may be radially disposed about the longitudinal axis of the growth unit, generally facing the internal space, and each growth site may be positioned to contact the liquid nutrient flow.

In some embodiments, there are at least two columns and at least one growth site on each column. Such columns may be vertically oriented. In yet other embodiments, the growth unit has at least three columns, which may be circumferentially disposed in a generally circular pattern. In other embodiments, there is only one column which contains a plurality of growth sites. In such an embodiment, the single column defines its internal space by, for example, coiling around the longitudinal axis.

In accordance with some embodiments, two or more of the growth sites are approximately equidistant from the longitudinal axis. In other embodiments, at least two growth sites are located on each of the one or more columns and at least some of the growth sites on each column are vertically spaced apart. In such an embodiment, the growth sites at generally the same vertical level may be approximately equidistant from the longitudinal axis. In still other embodiments, the growth unit comprises at least two columns and at least two growth sites are located on each column. In such an embodiment, the growth sites on each column may be vertically spaced apart, and growth sites at generally the same vertical level may be approximately equidistant from the longitudinal axis.

The nutrient supply module may act as a base into which the columns are located, and may be shaped to facilitate balance of the system, such as disc shaped. The columns may be shaped to facilitate the nutrient flow from the upper portion of each of the columns to the lower portion of each of the columns, such as tubular columns.

The plant growth unit may further include one or more fluid connectors, such as tubes, which connect the nutrient supply module with the upper portion of each of the one or more columns. The fluid connectors may be designed to facilitate the liquid nutrient flow from the nutrient supply module to the tops of each of the one or more columns.

Where each column supports a plurality of growth sites, the growth sites may be longitudinally aligned.

In yet another aspect of the present invention, there is provided a plant growth unit comprising one or more supporters, a plurality of growth sites supported by the supporters and means for establishing a liquid nutrient flow. The supporters may be radially disposable about a central vertical longitudinal axis defining an internal space between the one or more supporters. The supporters may be operable to form a generally closed perimeter around the internal space, each of the supporters having an upper portion and a lower portion. The internal space may be adapted to accommodate a light source. The growth sites may be radially disposed about the longitudinal axis and generally facing the internal space when the one or more supporters are radially disposed about the longitudinal axis and forming the generally closed perimeter. The liquid nutrient flow may be established by circulating the liquid nutrient to the upper portion of each of the one or more supporters and past the growth sites to the respective lower portion of each of the one or more supporters, so that the liquid nutrient flow comes into contact with each of the growth sites.

In some embodiments two or more of the growth sites are approximately equidistant from the longitudinal axis. In other embodiments, at least of the two growth sites may supported by each supporter and any growth sites at generally the same vertical level are approximately equidistant from the longitudinal axis. A plant growth unit may include at least two supporters supporting at least two growth sites, with any growth sites at generally the same vertical level being approximately equidistant from the longitudinal axis.

In some embodiments, the supporters include a first half and a second half which together form a generally circular perimeter around the internal space. The first half and the second half may each support a plurality of growth sites, with at least some of the growth sites on each of the first half and the second half being horizontally spaced apart from each other and with at least some of the growth sites on each of the first half and the second half being vertically spaced apart from each other. Any growth sites at generally the same vertical level may be approximately equidistant from the longitudinal axis. The plurality of growth sites on each of the first half and second half may form a plurality of generally horizontal rows, each of the horizontal rows having a plurality of growth sites.

Each of the one or more supporters may include a hollow wall having an inner side facing towards the internal space and an outer side facing away from the internal space. The inner and outer sides may define a hollow therebetween through which the liquid nutrient may pass. The growth sites may be supported by the inner surface so that roots of a plant located in one of the growth sites protrudes into the hollow. Each of the hollow walls may have a bottom on the lower portion so that the hollow wall is able to contain the liquid nutrient from which the liquid nutrient flow is established. In such an embodiment, the liquid nutrient flow establishing means may include one or more fluid connections, through which the liquid nutrient may pass, connecting the lower portion of each of the hollow walls to the respective upper portion of each of the hollow walls for establishing liquid nutrient flow. Such an embodiment may further include a tube extending along a horizontal length of the upper portion in the hollow of each of the hollow walls, each tube being connected to each of the respective one or more fluid connections, and one or more sprayers connected to each tube for misting roots extending into the hollow of each of the hollow walls.

In yet other embodiments, each of the one or more supporters may include a wall through which the growth sites are supported, so that roots of a plant located in one of the growth sites protrudes from the wall away from the internal space. In such an embodiment, the plant growth unit may further include a nutrient supply module. The liquid establishing means may include one or more sprayers in fluid communication with the nutrient supply module, the one or more sprayers misting roots protruding from the wall, and one or more collecting devices adjacent to the lower portion of the one or more supporters. The collecting device may be operable to collect the liquid nutrient as it travels to the lower portion of the one or more supporters. The collecting device may also be in fluid communication with the nutrient supply module to allow for recirculation of the liquid nutrient flow.

In other embodiments, the one or more supporters may be adapted to allow one or more supporters from another similar plant growth unit to be stacked on top the plant growth unit. Two or more similar plant growth units may be stacked on top of one another.

In some embodiments having two or more supporters, the supporters are free standing and moveable towards and away from a closed position wherein the supporters form the generally closed perimeter around the internal space. Where there are more than one supporters, two or more supporters may hinged to each other allowing for movement towards and away from the closed position.

The plant growth unit may further comprise one or more nutrient supply modules in fluid communication with the respective one or more supporters. The one or more nutrient supply modules may act as a base into which the respective supporters are located.

In another aspect, the present invention provides methods for growing plants in a growth unit. Supporting means may be disposed radially about a central vertical longitudinal axis, thereby defining an internal space between the supporting means, the internal space being adapted to accommodate a light source, and the supporting means having an upper portion and a lower portion. A plurality of growth sites may be introduced supported by the supporting means, the growth sites being radially disposed about the longitudinal axis and generally facing towards the internal space. A plurality of plants may be located in the growth sites and a liquid nutrient flow may be established by circulating a liquid nutrient to the upper portion of the supporting means to the respective lower portion of the supporting means, bringing the liquid nutrient into contact with the roots of the plants.

BRIEF DESCRIPTION OF DRAWINGS

In drawings which illustrate the embodiments of the invention.

DETAILED DESCRIPTION

Figure 1:
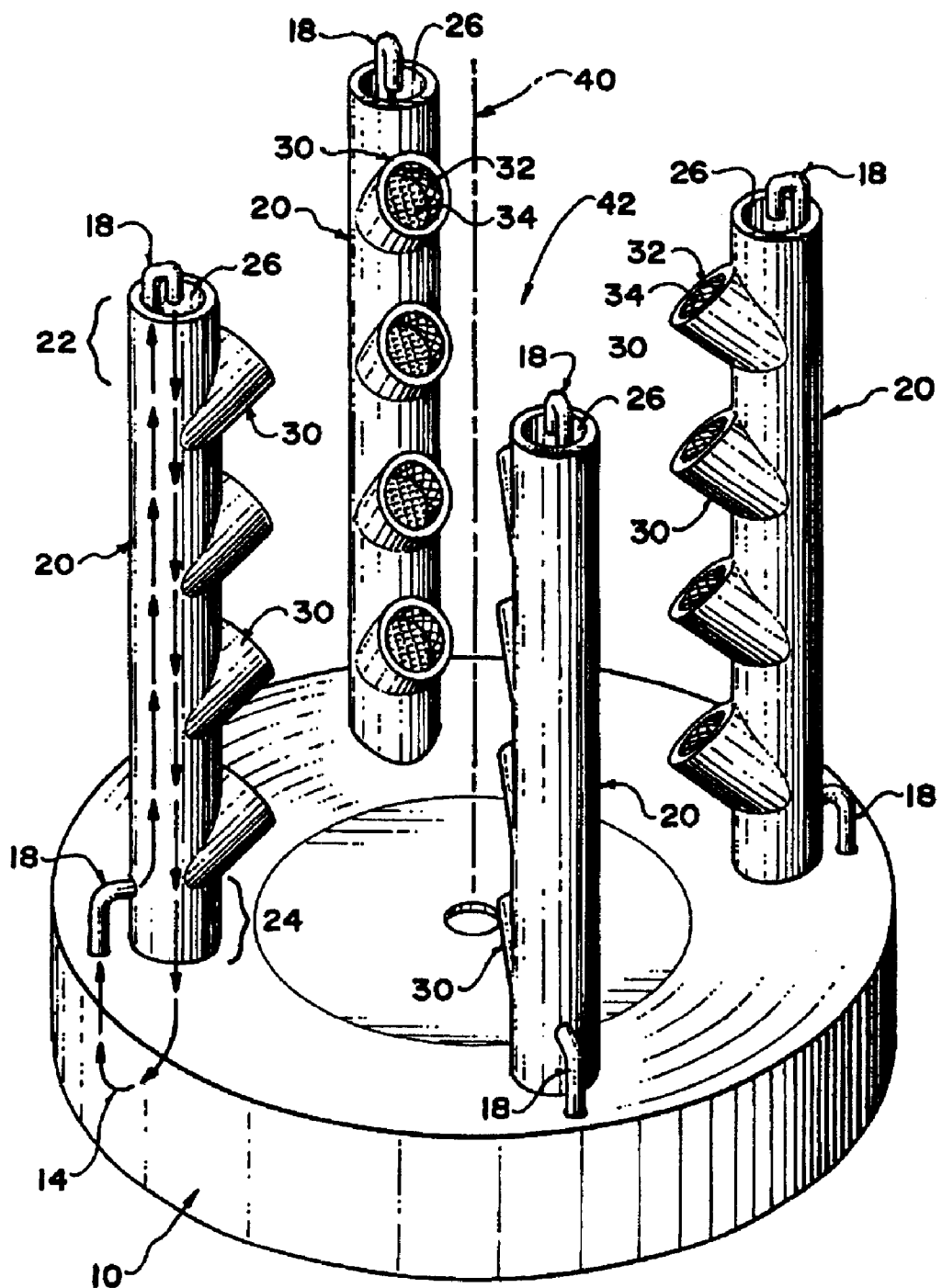
FIG. 1 is an isometric view of a plant growth unit according to an embodiment of the invention.
Figure 2:
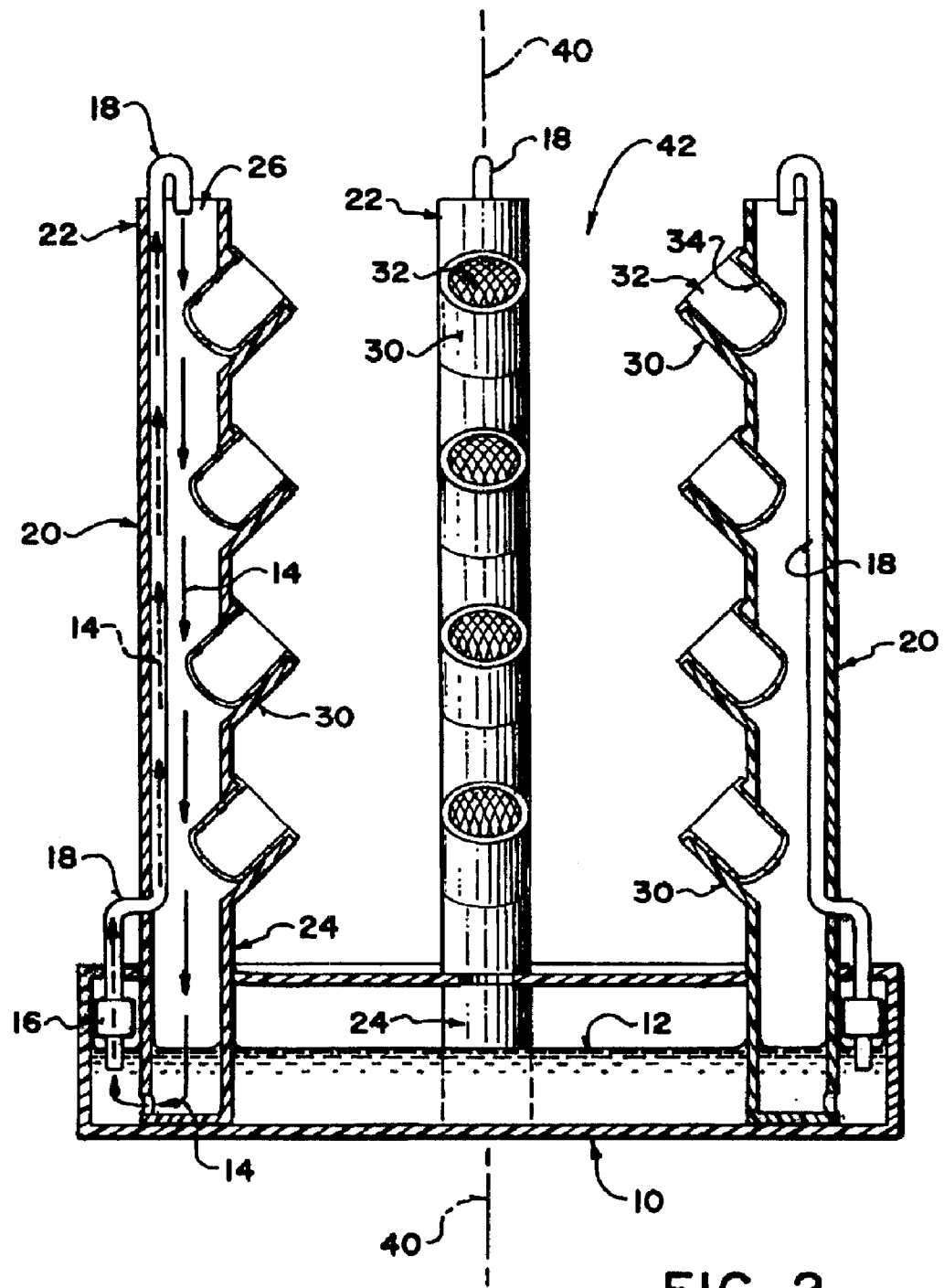
FIG. 2 is a longitudinal cross-sectional view of the plant growth unit of FIG. 1.

Referring collectively to FIGS. 1, 2 and 4 through 6, a plant growth unit according to a first embodiment is shown. The plant growth unit includes a nutrient supply module 10, a plurality of columns 20, and a plurality of growth sites 30 supported by the columns 20.

The nutrient supply module 10 is designed to contain a liquid nutrient 12. In the embodiment shown, the nutrient supply module 10 acts as a base for the plant growth unit. The nutrient supply module 10 thereby stabilizes the plant growth unit and the columns 20 contained therein. However, the nutrient supply module need not act as a base for the growth unit, which may be anchored or stabilized by alternative structures or supports.

The nutrient supply module 10 as shown in FIGS. 1 through 5 is disc shaped. However, the nutrient supply module may take on various shapes adapted to enable it to act as a nutrient supply module in fluid communication with the columns. 20. Where the nutrient supply module 10 is intended to act as a base for the growth unit, it may be designed to maintain balance and support of the growth unit when placed on its intended surface.

The nutrient supply module 10 may have a hole in the upper portion of the nutrient supply module 10 located approximately at the longitudinal axis 40, such a hole being adapted to hold a mesh basket for collecting medium and dead foliage to later be discarded, a allowing excess liquid nutrient 12 to pass into the nutrient supply module 10. It is not necessary that the nutrient supply module 10 have such a hole. The outer portion of the upper surface of the nutrient supply module 10 may also slope downwardly towards the longitudinal axis 40, allowing excess liquid nutrient 12 dripping from the columns 20 to drain towards the longitudinal axis 40 and the hole which may be present in the nutrient supply module 10. The upper surface of the nutrient supply module 10 may also be level, or may slope in other directions.

The nutrient supply module 10 may be made of plastic, such as food grade polyethylene or food grade polycarbonate. The nutrient supply module 10 may be manufactured by, for example, placing food grade polyethylene powder in an aluminum mold, which is then heated and rotated on two separate axes. The food grade polyethylene in the mold melts as the mold is heated and the centripetal force of the rotation forces the melted plastic to the walls of the aluminum mold where it cools as the mold is removed from the heat. The nutrient supply module 10 is then removed from the mold. In alternative embodiments, the nutrient supply module 10 may be manufactured from a variety of other materials capable of containing the liquid nutrient 12 and allowing for fluid communication with the columns 20.

Figure 3:
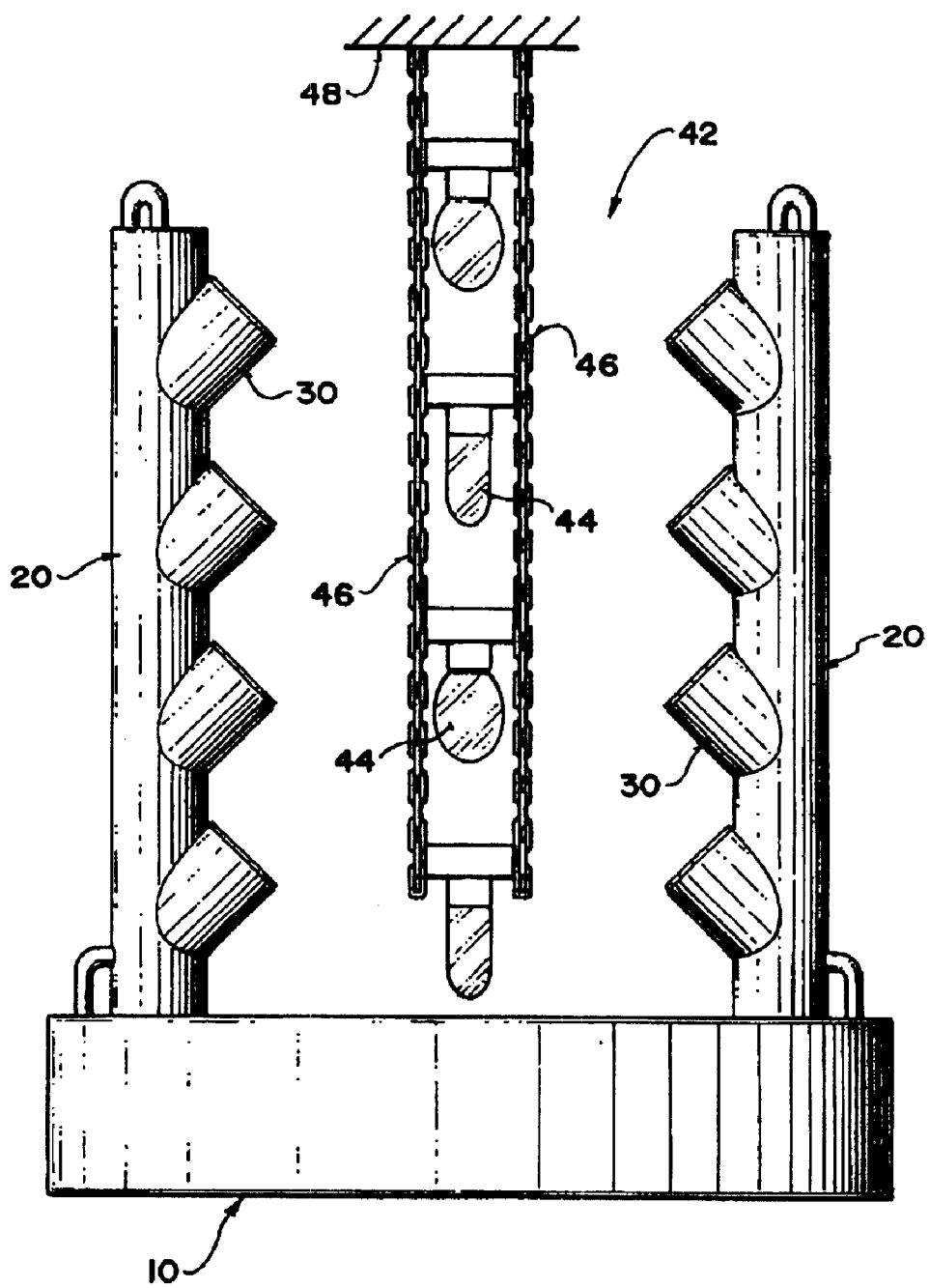
FIG. 3 is an elevational side view of a plant growth unit, in an embodiment including two columns.
Figure 4:
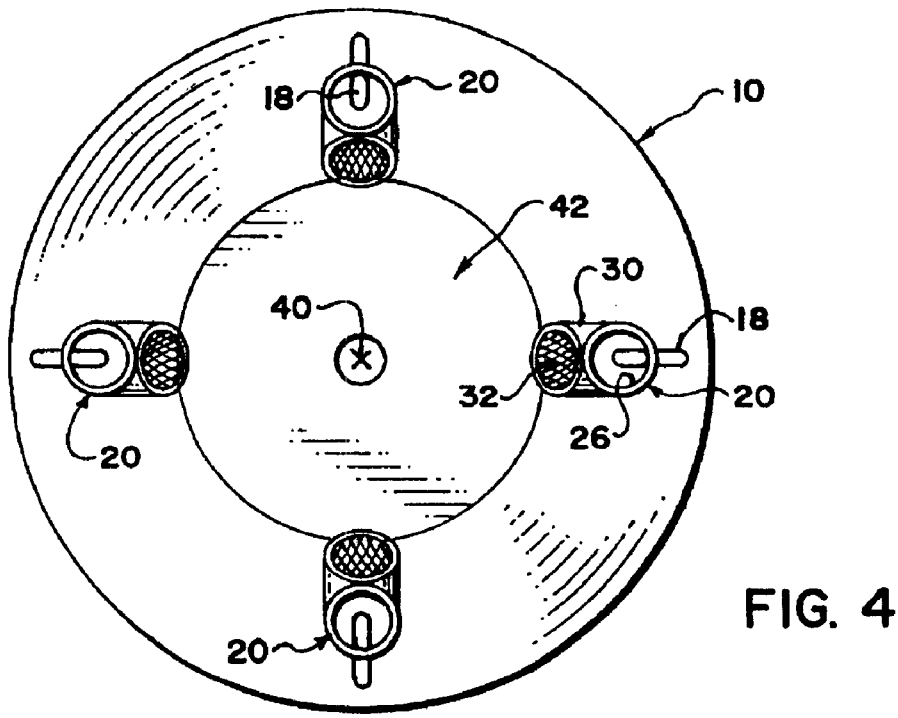
FIG. 4 is a top view of the plant growth unit of FIG. 1.
Figure 5:
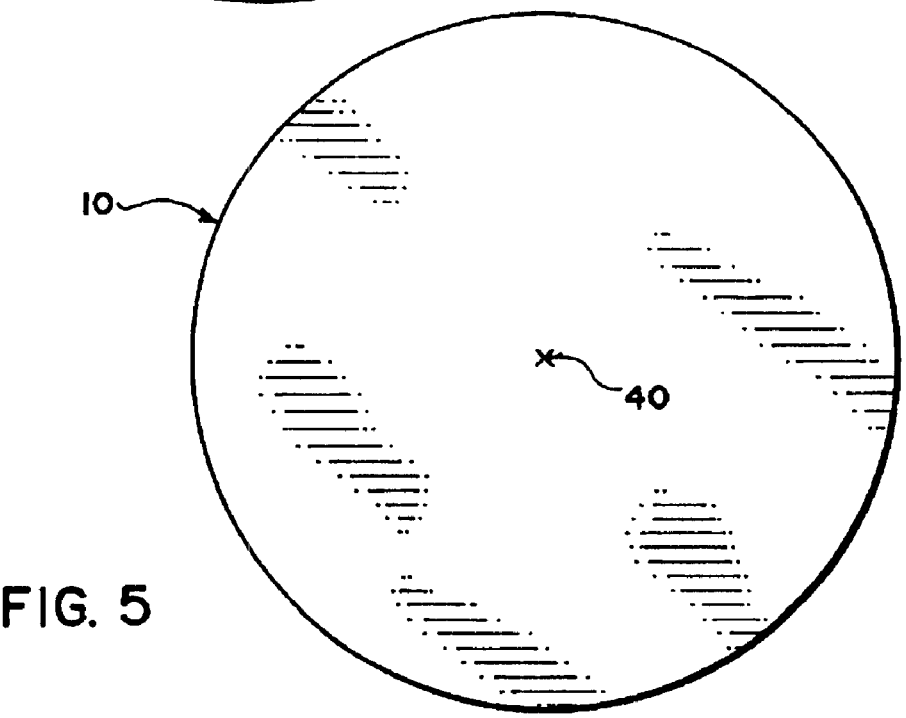
FIG. 5 is a bottom view of the plant growth unit of FIG. 1.

In the illustrated embodiment of FIGS. 1, 2, and 4 through 6, the columns 20 are radially disposed about a central vertical longitudinal axis 40 and define an internal space 42 between the columns 20. In the embodiments illustrated in FIGS. 1, 2 and 4 through 6, four columns 20 are disposed approximately equidistant from the longitudinal axis 40 and approximately equidistant from each other, as shown in FIG. 4. Any number of columns 20 may be arranged about the longitudinal axis 40. For example, as shown in FIG. 3, two columns 20 may be radially disposed about the longitudinal axis opposite each other. The columns 20 may be equidistant from the longitudinal axis 40 and equidistant from each other. Where there are at least three columns, the columns may be circumferentially disposed in a generally circular pattern. In alternative embodiments, the columns 20 need not be equidistant from the longitudinal axis 40 or each other, while the columns 20 remain radially disposed about the longitudinal axis 40 and define an internal space 42.

The columns 20 are generally vertically oriented and generally straight in the embodiments shown in FIGS. 1 through 6. In alternative embodiments, it is not necessary that the columns be vertically oriented and/or straight. The columns may angled in any direction, and at any degree. For example, the columns may be tilted towards or away from the longitudinal axis 40. The columns may also be of various appropriate curvatures or shapes. Appropriate curvatures and shapes of the columns may be selected so as to maintain the other functional objectives of the various embodiments of the invention.

The internal space 42 may be adapted to accommodate a light source. The light source may be, for example, a tubular light source which can be supported, for example by hanging, vertically between the columns 20 in the internal space 42. In some embodiments, for generally equidistant lighting and advantageous conditions for all plants growing in the growth unit, the tubular light source may be supported approximately along the longitudinal axis. Alternatively, as shown in the alternative embodiment of FIG. 3, the light source could be a series of bulbs 44 supported vertically between the columns 20 in the internal space 42, in some embodiments the series of bulbs 44 being aligned approximately along the longitudinal axis for generally equidistant lighting. A series of bulbs 44 may, for example, be vertically supported hung by a chain 46, or other support, from, for example, a support beam 48. The light source could also, for example, be a bulb hung in the internal space, or supported in the internal space by the base along the longitudinal axis. Appropriate bulbs for use as a light source include 400 watt Metal Halide, 400 watt High Pressure Sodium, 250 watt Metal Halide, 250 watt High Pressure Sodium and 430 watt Son Agro. Larger bulbs, such as 600 watt High Pressure Sodium, 1000 watt High Pressure Sodium or 1000 watt Metal Halide, may also be used; however, when larger bulbs as these are used as a light source for the plant growth unit, they may have to be continuously moved up and down the longitudinal axis when lit.

Each column 20 may have an upper portion 22, a lower portion 24 and a longitudinal passage 26 through which the liquid nutrient 12 may pass. The columns 20 may be tubular, thereby defining the longitudinal passage 26. The columns 20 may be made of plastic or another suitable material, such.as clay, metal or wood. The columns 20 may, for example, be manufactured by way of known injection mold techniques, or extruding plastic techniques. Alternatively, the columns 20 could be manufactured from pre-existing ABS or PVC elbows, tee's and straight lengths, which can be glued together. Metal elbows, Tee's and straight pipes could be welded together to form the columns 20. The columns 20 could alternatively be carved from wood, or other carvable material, or could be formed by gluing or nailing wooden planks together to form square columns. A column may also be formed from clay by shaping clay pieces and then mounting the clay pieces into a column.

The columns 20, in the embodiments shown, rest on the bottom of the nutrient supply module 10 and have a hole in the column such that the liquid nutrient flow 14 may pass out of the lower potion 24 of the columns 20. In alternative embodiments, the columns 20 may be supported above the bottom of the nutrient supply module and the liquid nutrient flow 14 may pass out of the bottom of the columns 20.

In some embodiments, the longitudinal passage 26 may be hollow or may contain a permeable material, such as a planting medium, through which the liquid nutrient 12 is able to pass. Suitable planting medium includes, but is not limited to, Hydroton™ (or other small round, kiln heated clay types), Sunshine Mix™ (or other peat perlite soil like mixes), perlite, vermiculite, rockwool, washed rock, sand, foam or animal castings. The permeable material is also not limited to planting medium. It may be possible to use a wide range of material which allows for the passage of the liquid nutrient 12 through the longitudinal passage 26, while still allowing the growth unit to meet the other functional objectives of various embodiments of the invention.

Each column 20 may be in fluid communication with the nutrient supply module 12 for circulation of a liquid nutrient flow 14. In the embodiments shown in FIGS. 1 through 6, a plurality of pumps 16 circulate the liquid nutrient 12 from the nutrient supply module 10 through a plurality of tubes 18 to the upper portion 22 of each of the columns 20 and through the longitudinal passage 26 to the respective lower portion 24 of each of the columns 20. In alternative embodiments, a single pump may facilitate the liquid nutrient flow 14. In some embodiments, once the liquid nutrient is pumped to the end of the tubes 18 at the upper portion 22 of each of the columns 20, the liquid nutrient is allowed to cascade down the longitudinal passage and back into the nutrient supply module 10 via gravitational pull. The pumps 16 may be, for example, Little Giant™ sump pump 1200 gph, or other such pumps manufactured by Magdrive™ and Rio™. The tubes 18 may be, for example, ½ inch commercial garden hose, ½ inch rubber garden hose, ½ inch ABS hose or other size hoses of the same type. The system connecting the tubes 18 to the columns 20 and the pump(s) 16 may incorporate ABS elbows, ABS stop plugs, hose clamps, rubber washers, ½ inch ABS tees, ½ inch shut off values and female to male hose adaptors, arranged to facilitate the liquid nutrient flow 14. Other types of fluid connectors are also contemplated by the present invention.

Alternative means for establishing the liquid nutrient flow 14 are also contemplated. For example, a pump may be located near the upper portion 22 of the columns 20 to pull the liquid nutrient 12 from the nutrient supply module 10. The tubes 18 do not have to be inside the columns 20, but may connect the nutrient supply module 10 to the upper portion 22 of each of the columns 20 on the outside of the columns 20. The present invention contemplates such other means for establishing the liquid nutrient flow.

In the embodiments illustrated, a plurality of growth sites 30 are located on each column 20, such growth sites 30 being radially disposed about the longitudinal axis 40 and generally equidistant from the longitudinal axis 40. As illustrated, the growth sites 30 generally face towards the internal space 42. This provides generally equidistant lighting in the embodiment shown to all plants in the growth unit when a tubular light source is vertically supported along the longitudinal axis 40.

There may be one or more growth sites 30 on each column 20. Where there is more than one growth site 30 on each column 20, the growth sites 30 may be vertically spaced apart on the columns 20.

The growth sites 30 may be equidistant from the longitudinal axis 40 for equidistant lighting, even where the columns 20 themselves are not equidistant from the longitudinal axis 40. However, in some embodiments the present invention also contemplates a growth unit where the growth sites are not equidistant from the longitudinal axis 40.

Where at least some of the growth sites 30 are vertically spaced apart on the columns 20, those growth sites 30 which are at generally the same vertical level may be equidistant from the longitudinal axis. This may provide advantageous lighting conditions to all the plants where, for example, a single bulb, located along the longitudinal axis, is used as a lighting source. In such a growth unit, the growth sites vertically further away from the bulb may be situated closer to the longitudinal axis than those growth sites vertically closer to the bulb, in order that all plants receive equidistant lighting for advantageous conditions. Those growth sites at the same vertical level may therefore be equidistant from the longitudinal axis, when even where not all growth sites in the growth unit are equidistant from the longitudinal axis. A variation in the distance of the growth sites from the longitudinal axis may be accomplished by tilting the columns or designing the columns to vary in distance from the longitudinal axis. Alternatively, the growth sites may.protrude from the columns at different lengths, varying the distance of the growth sites at different vertical levels to the longitudinal axis.

The growth sites 30 in the embodiments illustrated in FIGS. 1 through 6 protrude upwardly from the columns 20 in order to facilitate anchoring plants at the growth sites 30. The growth sites 30 in the embodiments illustrated angle upwardly at approximately a forty-five degree angle. The growth sites 30 may protrude from the columns 20 at alternative angles, however the angle will preferably be chosen as one appropriate to maintain plants in growth sites. The present invention also contemplates a growth unit where the growth sites 30 do not protrude from the columns 20.

In the embodiments shown in FIGS. 1 through 6, the growth sites 30 form a unitary part of the columns 20, the entire structure being formed from plastic or another suitable material. The invention also contemplates a growth unit where the growth sites 30 are not formed as a part of the columns 20, but are later attached to the growth unit as separate components.

The growth sites 30 shown in the illustrations have circular openings 32 into which plants may be anchored and grown. The present invention is not limited to growth sites which have circular openings for receiving the plants. The growth sites may take various forms which would allow for a plant to be grown. For example, the various shapes and sizes of planting pots as normally found in the field of gardening may be used as growth sites, the size being limited of course by the size of the growth unit. Accordingly, a wide variety of types of growth sites that could be used in growth units are contemplated by this invention.

Figure 6:
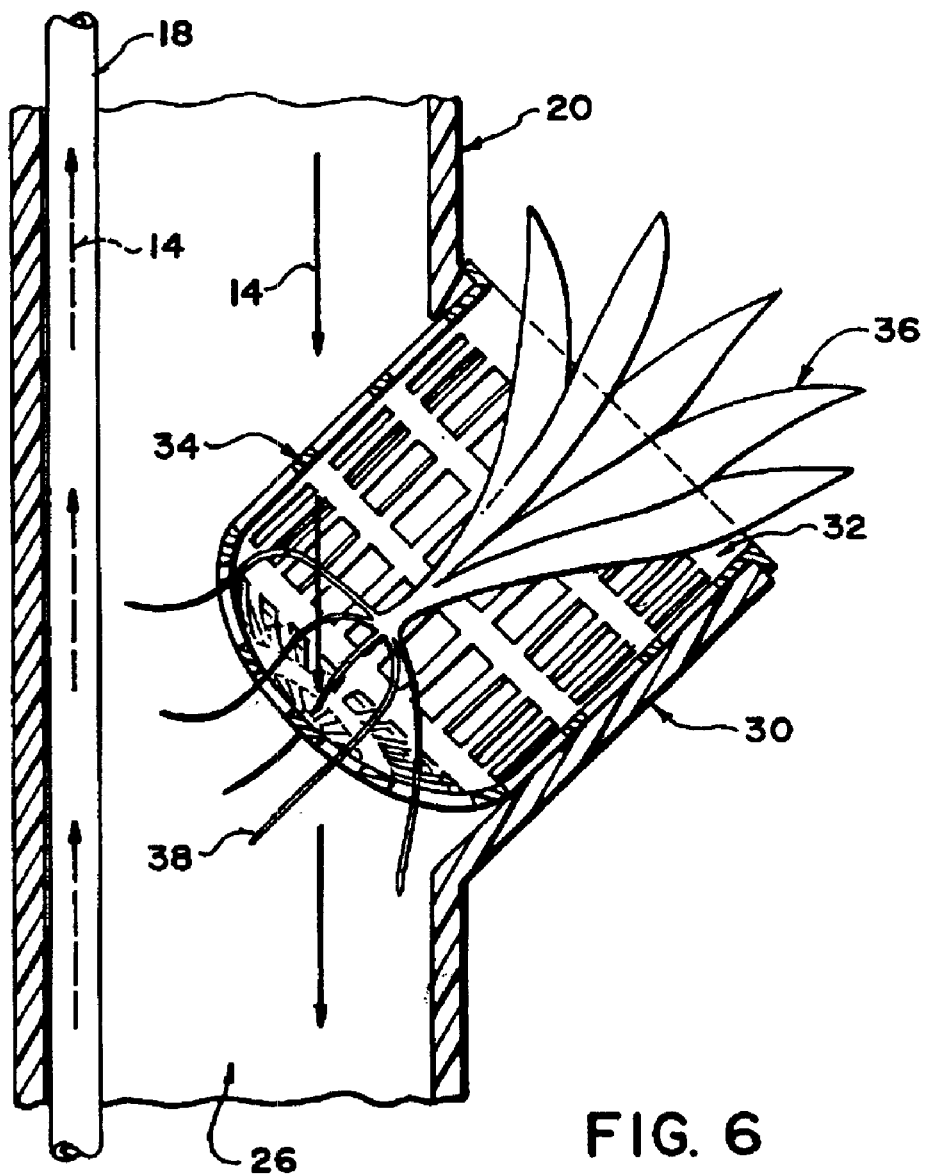
FIG. 6 is a longitudinal broken away cross-sectional of a portion of the column of the plant growth unit of FIG. 1.

In the embodiments shown in FIGS. 1 through 6, the growth unit includes baskets 34 which fit into the circular openings 32 of the growth sites 30. As shown in FIG. 6, the baskets 34 may be designed to hold plants 36. The baskets 34 may be made of plastic or another suitable material. In the embodiment shown, the baskets 34 are open weave baskets. The plants 36 sit in the baskets 34 and the plant roots 38 protrude through the bottom of the baskets 34. The present invention also contemplates other means for retaining the plants in the growth sites. For example, the columns 20 may contain a planting medium in the longitudinal passage 26 into which the plants may be anchored and grown.

Each growth site 30 may be positioned to contact the liquid nutrient flow 14. The plants 36 may be located in the baskets 34, which are placed in the growth sites 30, and the plant roots 38 protrude from the base of the baskets 34, as illustrated in FIG. 6. The plant roots 38 are therefore located within the longitudinal passage 26 of the column 20. As the liquid nutrient flow 14 is established through the longitudinal passage 26, the liquid nutrient flow 14 will come into contact with the plant roots 38.

There are other means for positioning the various types of growth sites such that the plant roots will come into contact with the liquid nutrient flow as it passes through the longitudinal passage of the columns. For example, where the longitudinal passage contains planting medium into which the plants are anchored at the growth sites, the roots of the plants will come into contact with the liquid nutrient flow as it travels through the planting medium.

Various types of liquid nutrient 12 may be used. The liquid nutrient may contain essential elements needed for plant growth, such as Nitrogen, Phosphorus, Calcium, Magnesium, Sulphur, Iron, Potassium, Boron, Manganese, Zinc, Copper, and Molybdenum. For example, GGold Nutrient Line™ or General Hydroponics Flora Line™ contain these essential elements needed for plant growth and therefore may be used as the liquid nutrient. The quality, quantity and type of liquid nutrient used will vary depending on many factors, such as the type and age of the plants being grown. The liquid nutrient should be chosen with a view to establishing advantageous growth conditions.

Figure 7:
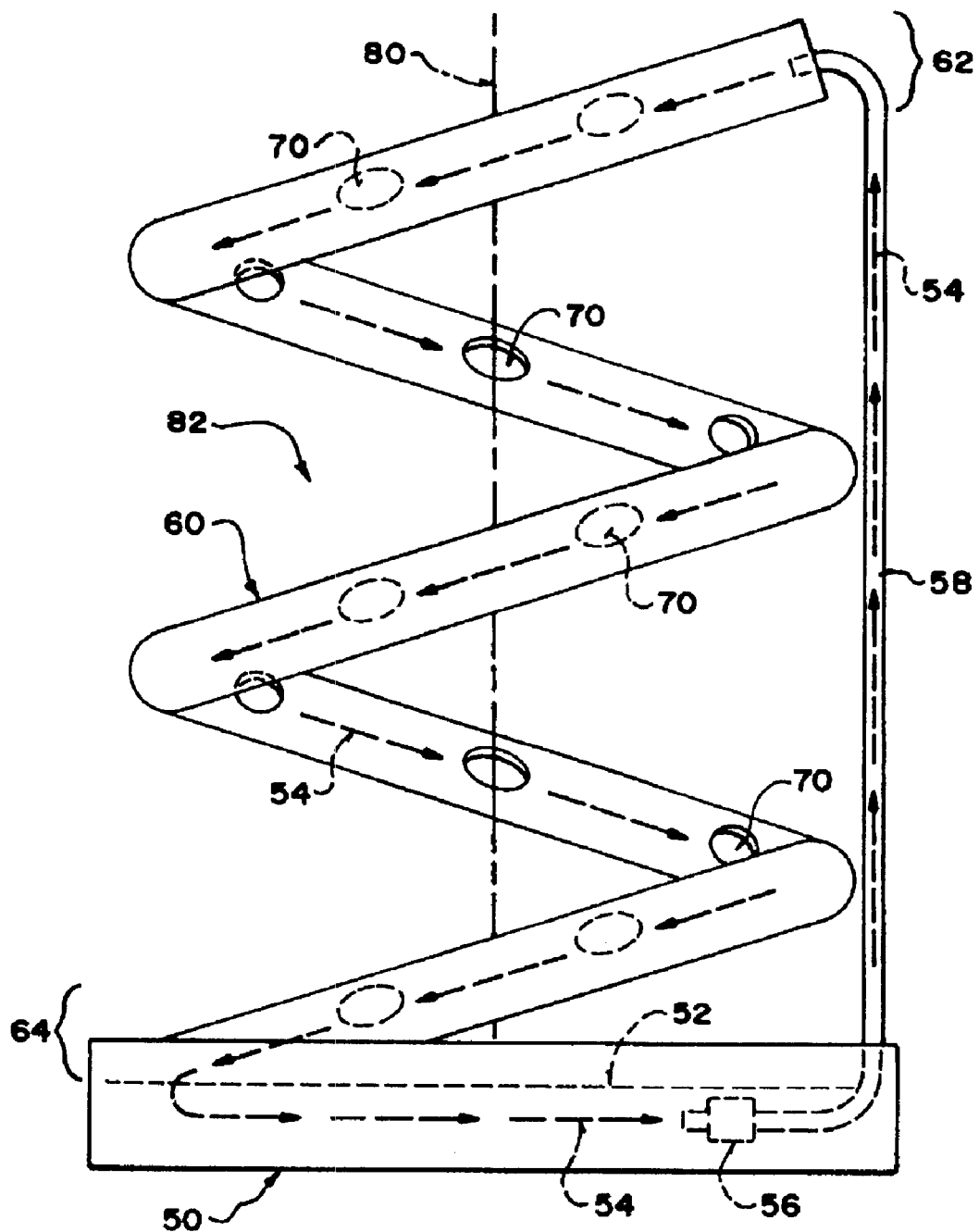
FIG. 7 is an elevational view of a plant growth unit, in an embodiment which includes a single column.

Referring to FIG. 7, a plant growth unit according to an alternative embodiment of the invention is shown. The plant growth unit includes a nutrient supply module 50, a single column 60 and a plurality of growth sites 70 supported by the column 60. As described above, the nutrient supply module 50 is designed to contain a liquid nutrient 52 and, as in the embodiment shown, may act as a base for the growth unit. The nutrient supply module 50 may take on various shapes and various modes of manufacture, as outlined above.

As shown in FIG. 7, the single column 60 is disposed radially about a central vertical longitudinal axis 80 and defines an internal space 82. This may be accomplished by wrapping the column 60 around the longitudinal axis. In the embodiment illustrated, the column 60 forms a uniform helical structure. The column 60 may, at all points, be generally equidistant from the longitudinal axis 80. However, the present invention contemplates many various forms that the column 60 may take in order to dispose itself radially about the central longitudinal axis 80 and define an internal space 82. The column 60 need not vertically rise in a uniform manner and all portions of the column 60 need not be equidistant from the longitudinal axis 80.

The internal space 82 in FIG. 7, as with the previously described embodiments, may be adapted to accommodate a light source. A variety of light sources may be used, as described above.

The column 60 may have an upper portion 62, a lower portion 64 and a longitudinal passage 66 through which the liquid nutrient may pass. As described above, the column 60 may be made of a variety of materials and constructed in a variety of ways. Further, as also described above, the longitudinal passage 66 may be empty or contain a permeable material through which the liquid nutrient 52 may pass.

The column 60 may be in fluid communication with the nutrient supply module 50 for circulation of a liquid nutrient flow 54. In the embodiment shown in FIG. 7, a pump 56 circulates the liquid nutrient from the nutrient supply module 50 through a tube 58 to the upper portion 62 of the column 60 and through the longitudinal passage 66 to the lower portion 64 of the column 60. As described above, various pumps 56 and tubes 58 are contemplated, as are other methods of establishing the liquid nutrient flow 54.

In an embodiment of the invention including a single column 60, a plurality of growth sites 70 may be located on the column 60. The growth sites 70 are radially disposed about the longitudinal axis 80 and the growth sites 70 generally face towards the internal space 82. In the embodiment shown, the growth sites 70 are located equidistant from the longitudinal axis 80, resulting in equidistant lighting to all plants in the growth unit when a vertical light source is supported along the longitudinal axis 80. Though the growth sites 70 may be equidistant from the longitudinal axis 80, as described above, the growth sites need not be equidistant from the longitudinal axis. In alternative embodiments, only those growth sites at generally the same vertical level may be equidistant from the longitudinal axis.

As also discussed above, in embodiments such as illustrated in FIG. 7, the growth sites 70 may or may not protrude from the column 60, and may do so at various distances and angles. The growth sites 70 may be of various shapes and sizes, and the growth unit may use various means for anchoring the plants in the growth sites 70. The growth sites 70 may be positioned to contact the liquid nutrient flow 54 in the various ways described above and there are various options for the liquid nutrient to be used.

Figure 8:
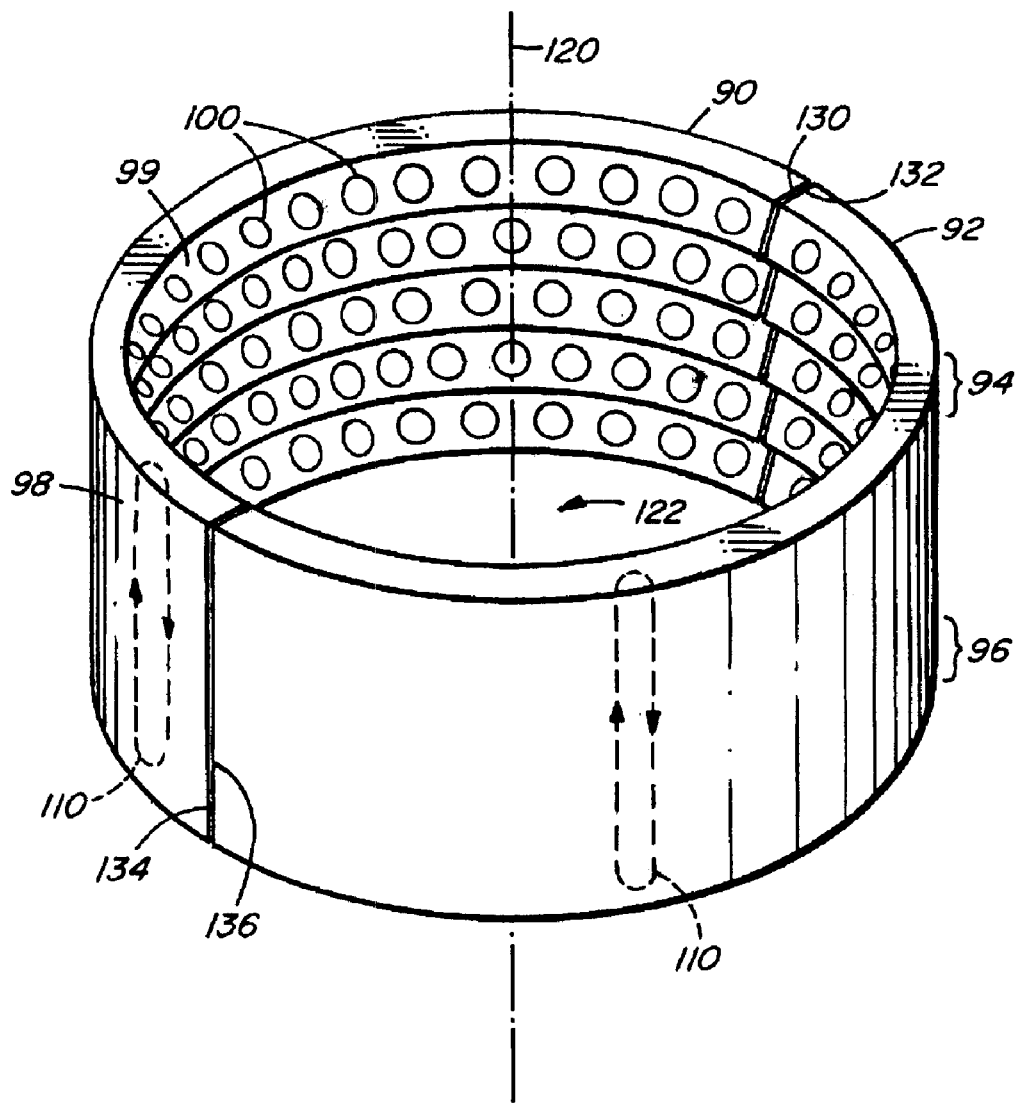
FIG. 8 is an isometric view of a plant growth unit according to an alternative embodiment of the invention.
Figure 9:
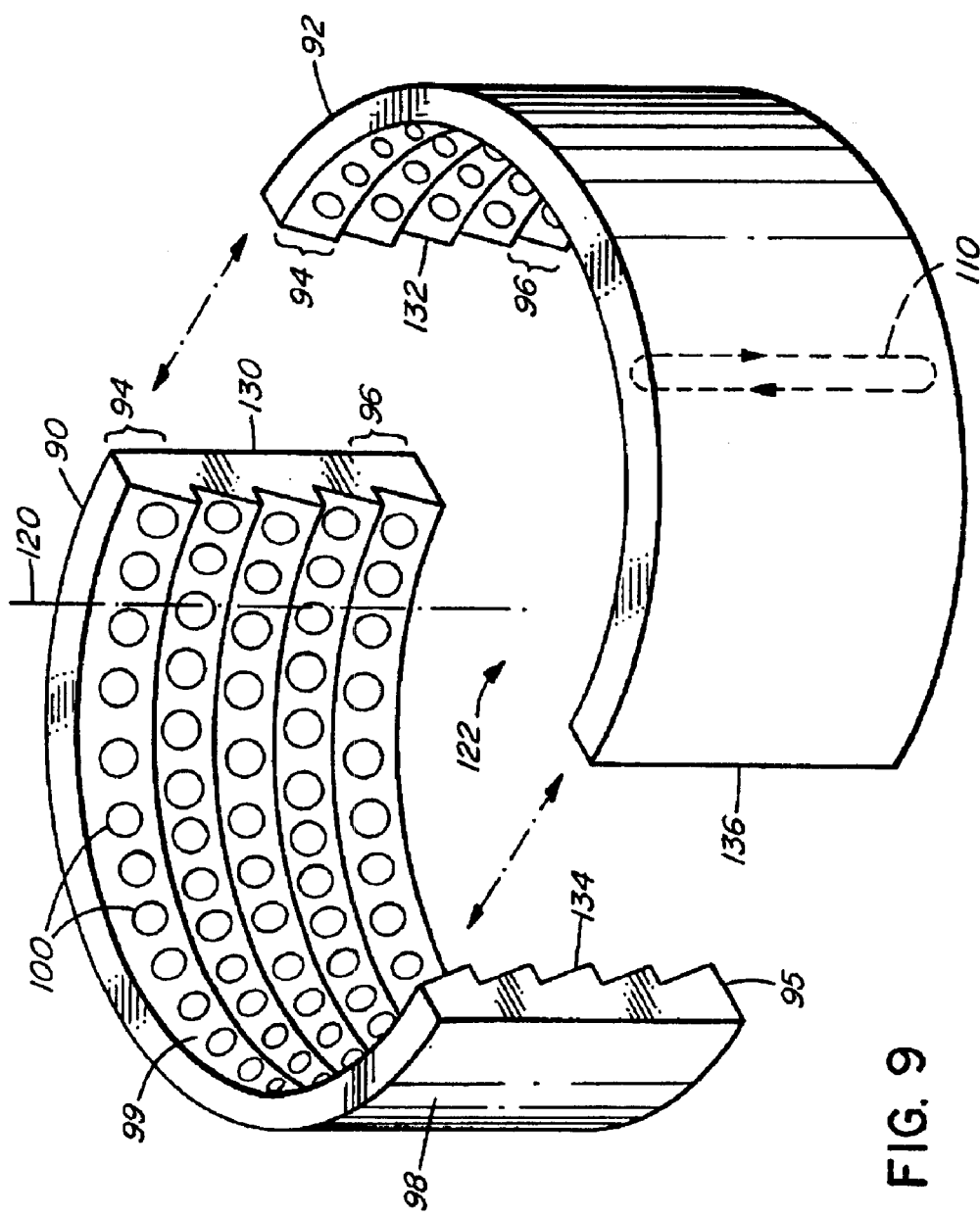
FIG. 9 is an isometric view of the plant growth unit of FIG. 8 with the first and second halves separated.
Figure 10:
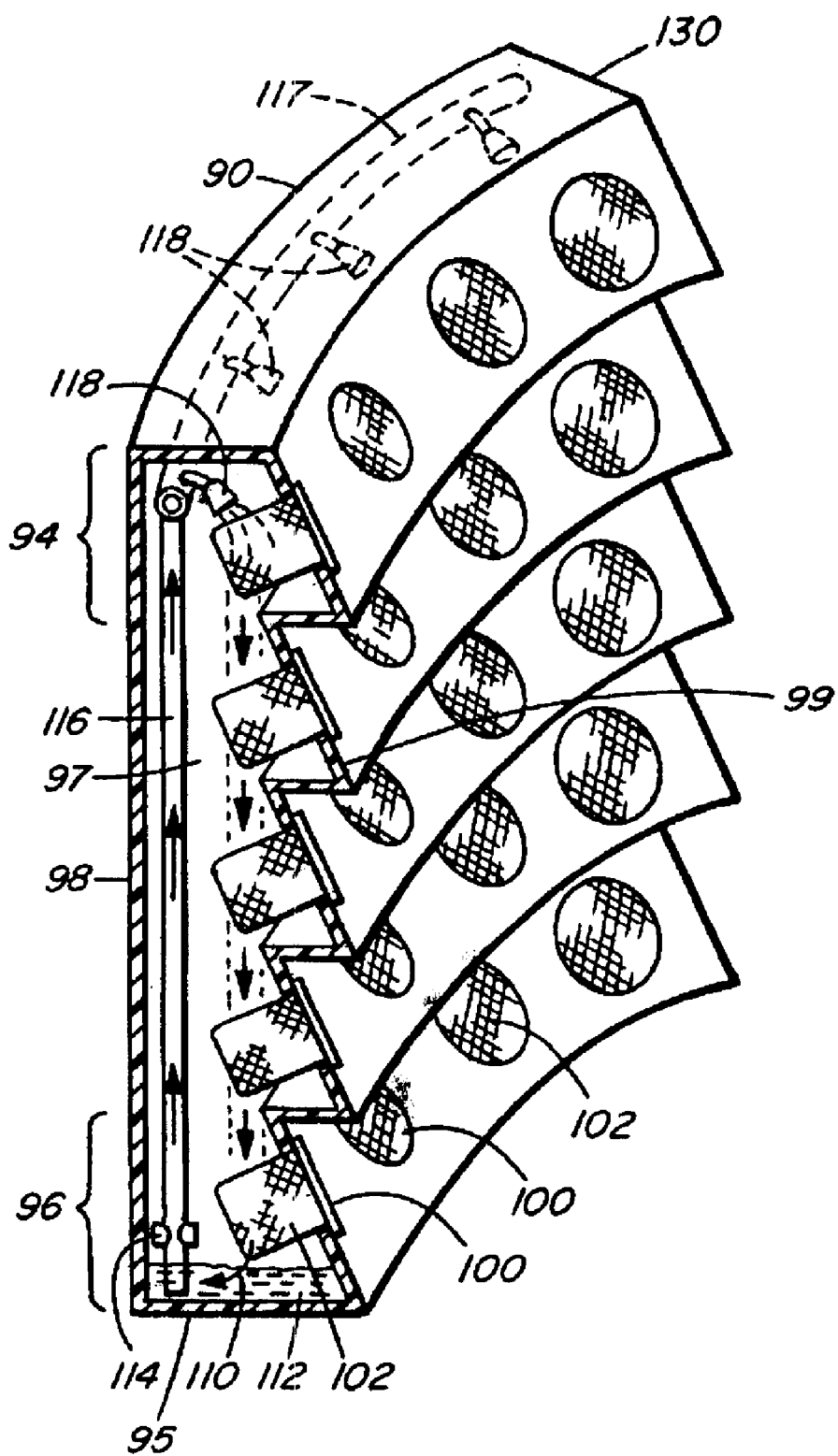
FIG. 10 is a longitudinal cross-sectional of a half of the plant growth unit of FIG. 8.

Referring collectively to FIGS. 8, 9 and 10, a plant growth unit according to a second alternative embodiment is shown. The plant growth unit includes two supporters 90 and 92, a plurality of growth sites 100 supported by the supporters 90 and 92, and means for establishing a liquid nutrient flow 110.

The supporters in the embodiment shown comprise a first semi-circular half 90 and a second semi-circular half 92. When placed together, as shown in FIG. 8, the first and second halves 90 and 92 are radially disposed about a central longitudinal axis 120 and define an internal space 122 between them. During operation of the plant growth unit the first half 90 and second half 92 form a closed circular perimeter around the internal space 122.

In the embodiment shown, the first and second halves 90 and 92 form a circular unit. The supporters do not have to be made of two semi-circular halves. In some embodiments, there may be a single supporter forming a generally closed perimeter around the internal space 122 or there may be more than two supporters. The supporters do not need to be curved to form a generally circular perimeter, but may be generally planar or curved in any number of ways, such that the generally closed perimeter formed by the supporters may take on any number of shapes radially disposable about the longitudinal axis 120. For example, any number of flat supporters may form a polygonal perimeter around the internal space 122.

The curvature of the semi-circular halves in the embodiment shown provide for all of the growth sites 100 to be equidistant from the longitudinal axis 120, allowing for generally equidistant lighting to all of the plants grown in such a unit. The supporters do not have to be curved as in the embodiment shown, but may take on a shape which allows for the formation of a generally closed perimeter around the internal space 122 while allowing for the plant growth sites 100 to be generally facing the internal space 122. In some embodiments, the supporters may be shaped to allow the growth sites 100 to be equidistant from the longitudinal axis 120. All of the growth sites 100 need not be equidistant from the longitudinal axis 120. In some embodiments, the growth sites 100 at generally the same vertical level are equidistant from the longitudinal axis 120.

The first and second halves 90 and 92 in the embodiment shown are generally vertically oriented and generally vertically straight. In alternative embodiments, the supporters do not need to be generally vertically oriented and/or vertically straight. The supporters may be angled in any direction, and at any degree. For example, the supporters may be tilted towards or away from the longitudinal axis 120. The supporters may also be of various appropriate curvatures or shapes. Appropriate curvatures or shapes of the supporters may be selected so as to maintain the other functional objectives of the various embodiments of the invention.

As described above with respect to the first embodiment, the internal space 122 in the embodiment shown in FIGS. 8 through 10 may be adapted to accommodate various types of light sources.

Each supporter 90 and 92 may have an upper portion 94 and a lower portion 96. The supporters 90 and 92 may be made of or formed from suitable materials such as those described above with respect to the columns in the first embodiment.

In the embodiment illustrated in FIGS. 8 through 10, the plant growth units 100 form five horizontal rows, each horizontal row having a plurality of growth sites 100. As illustrated, the plant growth sites 100 are generally equidistant from the longitudinal axis 120 and generally face towards the internal space 122. This provides generally equidistant lighting to all plants in the plant growth unit when a tubular light source is vertically supported along the longitudinal axis 120.

Each supporter may have any number of plant growth sites 100. Where each supporter has more than one growth site 100, the growth sites 100 may be vertically and/or horizontally spaced apart from each other. The growth sites 100 do not need to be arranged in horizontal rows, as shown in the illustrated embodiment, but can take any number of arrangements. Where the growth sites 100 are arranged in horizontal rows on the supporters, they can form any number of horizontal rows and each row can have any number of growth sites 100.

The growth sites 100 may be equidistant from the longitudinal axis 120 for equidistant lighting, even when the supporters themselves are not equidistant from the longitudinal axis 120. However, in some embodiments the present invention also contemplates a growth unit where the growth sites 100 are not equidistant from the longitudinal axis 120. For example, it may be necessary to have plants at different stages of development be closer or nearer the light source.

As described above with respect to the first embodiment, where the growth sites 100 are vertically spaced apart on the supporters, those growth sites which are a generally the same vertical level may be equidistant from the longitudinal axis to provide advantageous lighting to all the plants where, for example, a single bulb, located along the longitudinal axis, is used as a lighting source. In such an embodiment, it may be advantageous to have the plant growth sites at different vertical levels to be closer or further away from the longitudinal axis, for example by angling the supporters or protruding the growth sites from the supporters.

The first and second halves 90 and 92, in the embodiment shown, are hollow walls having an outer side 98 and an inner side 99 defining a hollow 97 therebetween, as shown in FIG. 10. The hollow 97 is adapted to allow for the liquid nutrient 112 to pass through it. In the embodiment shown, the hollow 97 is truly a hollow. However, in some embodiments, the hollow 97 may contain a suitable permeable material through which the liquid nutrient 112 is able to pass, as described above with respect to the first embodiment. A wide range of materials is possible to use, where such material allows for the passage of the liquid nutrient flow 110 through the hollow 97, while still allowing the growth unit to meet the other functional objectives of the various embodiments.

In the embodiment shown, the hollow walls of the first and second halves 90 and 92 have bottoms 95 on the lower portion 96, enabling the hollow walls to contain the liquid nutrient 112, from which the liquid nutrient flow 110 is established. Thus, in the embodiment illustrated, the first and second halves 90 and 92 themselves act as a nutrient supply reservoir. As shown in FIG. 10, a pump 114 circulates the liquid nutrient 112 from the lower portion 96 of the each of the first and second halves 90 and 92, through a tube 116, through a semi-circular tube 117 extending longitudinally along the upper portion 94 in the hollow 97, and out a plurality of sprayers 118. The liquid nutrient 112 then travels, in some embodiments by gravitational pull, through the hollow 97, past the roots of plants located in the plant growth sites 100 and back to the lower portion 96 of each respective half. In some embodiments, the growth sites 100 are vertically aligned so that the liquid nutrient drips through the roots of each respective aligned growth site to the growth site below. In alternative embodiments, a plurality of pumps may facilitate the liquid nutrient flow 112. Instead of a semi-circular tube 117, there may be a plurality of tubes 116 providing liquid nutrient 112 to the plant growth sites 100. In some embodiments, there may be a single sprayer 118 in each supporter; alternatively, each growth site 100 may be provided with a sprayer 118 for misting plan roots. The possible types of pumps 114, tubes 116 and 117, and the fluid connectors, used to establish the liquid nutrient flow 112, that may be used include those described above with respect to the first embodiment. Alternative means for establishing the liquid nutrient flow, also as described above, are also contemplated.

The liquid nutrient 112, need not be contained within the hollow wall. In some embodiments, there may be provided one or more nutrient supply modules in fluid communication with the one or more hollow walls. Such nutrient supply modules may take on many different shapes and be made from many different materials, as described above. The nutrient supply module may act as a base for the plant growth unit, thereby stabilizing the hollow walls contained therein, and may be appropriately shaped for maintaining balance and support of the plant growth unit. In some embodiments, each hollow wall has its own nutrient supply module which may act as base for each respective hollow wall. In some embodiments where the nutrient supply module acts as a base, the hollow wall may have a hole in the lower portion such that the liquid nutrient flow may pass out of the lower portion into the nutrient supply module. In alternative embodiments, the hollow wall may not have a bottom and the hollow wall may be supported above the bottom of the nutrient supply module for the liquid nutrient to pass out of the hollow wall.

In the embodiment shown in FIGS. 8 through 10, the supporters are hollow walls. However, the supporters do not need to be hollow walls. In alternative embodiments, the supporters are relatively narrow walls through which the plant growth sites 100 are supported. The roots of plants planted in such a supporter would extend from the wall on the outer side of the wall away from the internal space, being open to the surrounding environment rather than contained within a hollow in the wall. In such an embodiment, the liquid nutrient flow may be established by including in the growth unit a separate nutrient supply module in fluid communication with one or more sprayers. The liquid nutrient may be pumped out the sprayers to mist the roots of the plant roots protruding from the outside of the supporter. In some embodiments, the plant growth unit would also include one or more collecting devices adjacent to the lower portion of the one or more supporters for collecting the liquid nutrient as gravity pulls it down past the plant roots. Such a collecting device may be in fluid communication with the nutrient supply module to allow for re-circulation of the liquid nutrient. In other embodiments, the nutrient supply module may act as a base, as described above, which collects the liquid nutrient as it travels to the lower portion of each supporter.

In the embodiments as illustrated in FIGS. 8 through 10, the growth sites 100 form a unitary part of the inner side 99 of the hollow walls of the first and second halves 90 and 92. The growth sites 100 protrude upwardly from the halves 90 and 92 due to the shape of the inner side 99. As discussed above in relation to the first embodiment, the growth sites 100 may or may not protrude from the supporters, and may do so at various distances and angles. Also as described above, the plant growth unit may further include baskets 102 for holding the plants, to be attached to the growth sites 100. The growth sites 100 may be of various shapes and sizes, and the growth unit may use various means for anchoring the plants in the growth sites 100. The growth sites 100 may be positioned to contact the liquid nutrient flow 110 and there are various options for the liquid nutrient to be used as described above in relation to the first embodiment.

In the embodiment shown in FIGS. 8 through 10, the hollow wall of the first half 90 has closed ends 130 and 134, and the hollow wall of the second half 92 has closed ends 132 and 136. The first and second halves 90 and 92 are free standing in the embodiment shown. During operation, the first ends 130 and 132 are adjacent to one another and the second ends 134 and 136 are adjacent to one another, as shown in FIG. 8, to form a closed perimeter around the internal space. However, the first ends 130 and 132 and the second ends 134 and 136 are able to be moved towards and away from each other, as shown in FIG. 9, to allow access the growth sites 100. The first and second halves 90 and 92 may be hinged at the first ends 130 and 132 or the second ends 134 and 136 to allow a person to open and close the perimeter around the internal space from one side. Such hinging may facilitate the stability of the plant growth unit, particularly where the supporters are free standing. Where a plurality of supporters are present, two or more may be hinged to each other. The supporters may further include devices to facilitate moving the supporters towards and away from the closed perimeter position. For example, the bottom of the supporters may have wheels or tracks which allow for such movement.

The plant growth unit as shown in FIGS. 8 through 10 may be adapted to allow for stacking of similar plant growth units on top of one another. Any number of plant growth units may be stacked on top of one another to utilize vertical space without taking up additional horizontal space. The plant growth unit may include structural features that allow for stable stacking between similar units, or a locking mechanism to hold the units together. For example, there may be provided knobs which screw to the top of the bottom unit to the bottom of the upper unit to lock the units together. There may also be provided a H-shaped locking device that fits between an upper and lower unit, the cross of the H-shaped device sitting between the two units and the arms of the H-shaped device preventing lateral movement between the units.

The present invention also contemplates a method for growing plants where a plant growth unit as described above is provided, plants are planted into the growth sites and a liquid nutrient flow is established.

While specific embodiments of the invention have been described and illustrated, such embodiments should be considered illustrative of the invention only and not as limiting the invention as construed in accordance with the accompanying claims.

What is claimed is:

1. A plant growth unit comprising:
    (a) a plurality of growth sites;
    (b) means for supporting the growth sites radially about a central vertical longitudinal axis, the supporting means defining an internal space between the plurality of growth sites so that the growth sites generally face the internal space, the internal space being adapted to accommodate a light source, the supporting means having an upper portion and a lower portion; and (c) means for establishing a liquid nutrient flow by circulating a liquid nutrient to the upper portion of the supporting means and past growth sites to the lower portion of the supporting means so that the liquid nutrient flow comes into contact with each of the growth sites.

2. A plant growth unit as claimed in claim 1, wherein two or more of the growth sites are approximately equidistant from the longitudinal axis.

3. A plant growth unit as claimed in claim 1, wherein at least some of the growth sites are vertically spaced apart, and the growth sites at generally the same vertically level are approximately equidistant from the longitudinal axis.

4. A plant growth unit as claimed in claim 1, further comprising means for containing the liquid nutrient.

5. A plant growth unit as claimed in claim 1, further comprising at least one pump facilitating the liquid nutrient flow.

6. A plant growth unit as claimed in claim 1, wherein the growth sites protrude upwardly from the supporting means.

7. A plant growth unit as claimed in claim 1 further comprising a plurality of baskets adapted to hold plants and attachable to the growth sites.

8. A plant growth unit comprising:
(a) a nutrient supply module able to contain a liquid nutrient;
(b) one or more columns radially disposed about a central vertical longitudinal axis defining an internal space between the one or more columns, the internal space being adapted to accommodate a light source, each column having an upper portion, a lower portion and a longitudinal passage through which the liquid nutrient may pass, and each column being in fluid communication with the nutrient supply module for circulation of a liquid nutrient flow from the nutrient supply module to the upper portion of each of the one or more the columns and through the longitudinal passage to the respective lower portion each of the one or more columns; and
(c) a plurality of growth sites supported by the one or more columns, the growth sites being radially disposed about the longitudinal axis and generally facing the internal space, each growth site being positioned to contact the liquid nutrient flow.

9. A plant growth unit as claimed in claim 8, wherein two or more of the growth sites are approximately equidistant from the longitudinal axis.

10. A plant growth unit as claimed in claim 8, wherein at least two growth sites are located on each of the one or more columns, at least some of the growth sites on each of the one or more columns being vertically spaced apart, and the growth sites at generally the same vertical level are approximately equidistant from the longitudinal axis.

11. A plant growth unit as claimed in claim 8, comprising at least two columns and wherein at least two growth sites are located on each column, the growth sites on each column being vertically spaced apart, and any growth sites at generally the same vertical level being approximately equidistant from the longitudinal axis.

12. A plant growth unit as claimed in claim 8, wherein the nutrient supply module is a base into which the columns are located for support.

13. A plant growth unit as claim in claim 12, wherein the nutrient supply module is disc shaped.

14. A plant growth unit as claimed in claim 8, wherein there are at least three columns.

15. A plant growth unit as claimed in claim 14, wherein the columns are circumferentially disposed in a generally circular pattern.

16. A plant growth unit as claimed in claim 8, wherein the columns are tubular.

17. A plant growth unit as claimed in claim 8, comprising at least two columns, wherein each column is generally vertically oriented and at least one growth site is located on each column.

18. A plant growth unit as claimed in claim 8, further comprising one or more fluid connections, through which the liquid nutrient may pass, connecting the nutrient supply module with the upper portion of each of the one or more columns for the liquid nutrient flow.

19. A plant growth unit as claimed in claim 8 wherein the growth sites on each column are longitudinally aligned.

20. A plant growth unit comprising:
(a) one or more supporters radially disposable about a central vertical longitudinal axis defining an internal space between the one or more supporters, the internal space being adapted to accommodate a light source, the supporters operable to form a generally closed perimeter around the internal space, each of the supporters having an upper portion and a lower portion;
(b) a plurality of growth sites supported by the one or more supporters, the growth sites being radially disposed about the longitudinal axis and generally facing the internal space when the one or more supporters are radially disposed about the longitudinal axis and forming the generally closed perimeter; and
(c) means for establishing a liquid nutrient flow by circulating the liquid nutrient to the upper portion of each of the one or more supporters and past the growth sites to the respective lower portion of each of the one or more supporters, so that the liquid nutrient flow comes into contact with each of the growth sites.

21. A plant growth unit as claimed in claim 20, wherein two or more of the growth sites are approximately equidistant from the longitudinal axis.

22. A plant growth unit as claimed in claim 20, wherein at least two growth sites are supported by each supporter, wherein any growth sites at generally the same vertical level are approximately equidistant from the longitudinal axis.

23. A plant growth unit as claimed in claim 20 comprising at least two supporters and wherein at least two growth sites are supported on each supporter, any growth sites at generally the same vertical level being approximately equidistant from the longitudinal axis.

24. A plant growth unit as claimed in claim 23, wherein the supporters comprise a first half and a second half which together form a generally circular perimeter around the internal space.

25. A plant growth unit as claimed in claim 24, wherein the first half and the second half each support a plurality of growth sites, at least some of the growth sites on each of the first half and the second half being horizontally spaced apart from each other and at least some of the growth sites on each of the first half and the second half being vertically spaced apart from each other, any growth sites at generally the same vertical level being approximately equidistant from the longitudinal axis.

26. A plant growth unit as claimed in claim 25, wherein the plurality of growth sites on each of the first half and second half form a plurality of generally horizontal rows, each of the horizontal rows having a plurality of growth sites.

27. A plant growth unit as claimed in claim 20, wherein each of the one or more supporters comprise a hollow wall having an inner side facing towards the internal space and an outer side facing away from the internal space, the inner and outer sides defining a hollow therebetween through which the liquid nutrient may pass, the growth sites being supported by the inner surface so that roots of a plant located in one of the growth sites protrudes into the hollow.

28. A plant growth unit as claimed in claim 27, wherein each of the hollow walls has a bottom on the lower portion so that the hollow wall is able to contain the liquid nutrient from which the liquid nutrient flow is established.

29. A plant growth unit as claimed in claim 28, wherein the liquid nutrient flow establishing means comprises one or more fluid connections, through which the liquid nutrient may pass, connecting the lower portion of each of the hollow walls to the respective upper portion of each of the hollow walls for establishing liquid nutrient flow.

30. A plant growth unit as claimed in claim 29, further comprising:
   (a) a tube extending along a horizontal length of the upper portion in the hollow of each of the hollow walls, each tube being connected to each of the respective one or more fluid connections; and
   (b) one or more sprayers connected to each tube for misting roots extending into the hollow of each of the hollow walls.

31. A plant growth unit as claimed in claim 20, wherein each of the one or more supporters comprise a wall through which the growth sites are supported, so that roots of a plant located in one of the growth sites protrudes from the wall away from the internal space.

32. A plant growth unit as claimed in claim 31, further comprising a nutrient supply module and wherein the liquid nutrient flow establishing means comprises:
   (a) one or more sprayers in fluid communication with the nutrient supply module, the one or more sprayers misting roots protruding from the wall; and
   (b) one or more collecting devices adjacent to the lower portion of the one or more supporters, the collecting device operable to collect the liquid nutrient as it travels to the lower portion of the one or more supporters, the collecting device being in fluid communication with the nutrient supply module to allow for circulation of the liquid nutrient flow.

33. A plant growth unit as claimed in claim 20 wherein the one or more supporters are adapted to allow one or more supporters from another similar plant growth unit to be stacked on top of the plant growth unit.

34. A plant growth unit as claimed in claim 33 wherein the one or more supporters are stacked with one or more supporters from one or more other similar plant growth units.

35. A plant growth unit as claimed in claim 23, wherein the supporters are free standing and moveable towards and away from a closed position wherein the supporters form the generally closed perimeter around the internal space.

36. A plant growth unit as claimed in claim 20, further comprising one or more nutrient supply modules in fluid communication with the respective one or more supporters.

37. A plant growth unit as claimed in claim 36, wherein the one or more nutrient supply modules is a base into which the respective supporters are located.

38. A plant growth unit as claimed in claim 23, wherein at least two of the supporters are hinged to each other allowing for movement towards and away from closed a position wherein the supporters form the generally closed perimeter around the internal space.

39. A method for growing plants comprising:
   (a) disposing supporting means radially about a central vertical longitudinal axis, thereby defining an internal space between the supporting means, the internal space being adapted to accommodate a light source, and the supporting means having an upper portion and a lower portion;
   (b) introducing a plurality of growth sites supported by the supporting means, the growth sites being radially disposed about the longitudinal axis and generally facing towards the internal space;
   (c) locating a plurality of plants in the growth sites;
   (d) establishing a liquid nutrient flow by circulating a liquid nutrient to the upper portion of the supporting means to the respective lower portion of the supporting means, bringing the liquid nutrient into contact with the roots of the plants.

* * * * *